US012715598B1

(12) United States Patent
Krzywon

(10) Patent No.: US 12,715,598 B1
(45) Date of Patent: Aug. 25, 2026

(54) USE OF PROPELLER ELECTRONIC CONTROLLER IN PROTECTION FROM UNCONTROLLABLE HIGH THRUST

(71) Applicant: Pratt & Whitney Canada Corp., Longueuil (CA)

(72) Inventor: Jagoda Krzywon, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/061,718

(22) Filed: Feb. 24, 2025

(51) Int. Cl.
*B64D 31/09* (2024.01)
*B64C 11/30* (2006.01)

(52) U.S. Cl.
CPC ............ *B64D 31/09* (2024.01); *B64C 11/305* (2013.01)

(58) Field of Classification Search
CPC ...... F02C 9/00; F02C 9/28; F02C 9/46; B64C 27/57; B64C 31/06; B64C 31/09; B64C 31/10; B64C 11/305; F05D 2270/021
See application file for complete search history.

(56) References Cited

U.S. PATENT DOCUMENTS 4,137,707 A 2/1979 Wanger
4,417,440 A 11/1983 Hawes
5,709,079 A 1/1998 Smith
9,771,906 B2 9/2017 Henson
9,932,120 B2 4/2018 Fisher et al.
9,932,906 B2 4/2018 Xiong et al.
11,035,300 B2 * 6/2021 Smith ........................ F02C 9/00
11,053,861 B2 7/2021 Moster et al.
11,313,286 B2 * 4/2022 Chahal ...................... F02C 9/28
11,346,290 B2 5/2022 Cai et al.
11,408,357 B2 * 8/2022 Chahal ...................... F02C 9/58
11,760,495 B2 9/2023 Mark et al.
11,788,475 B2 10/2023 Ettorre et al.
11,852,083 B2 * 12/2023 Chahal .................. B64D 31/00
11,927,143 B2 3/2024 Donini et al.
11,958,622 B2 4/2024 Poisson et al.
11,964,750 B2 4/2024 Zakucia et al.
11,965,424 B2 4/2024 Sibbach et al.
11,976,633 B2 5/2024 Cai et al.
2019/0092453 A1 3/2019 Hoemke et al.
2020/0165984 A1 * 5/2020 Chahal ...................... F02C 9/28
2022/0243668 A1 8/2022 Krzywon
2024/0367776 A1 11/2024 Boche et al.
2024/0391583 A1 11/2024 Calkins et al.

FOREIGN PATENT DOCUMENTS

EP 1848884 B1 7/2016
EP 3392485 B1 12/2019
GB 2300451 B 10/1999

OTHER PUBLICATIONS

European Search Report dated Jun. 23, 2026, in connection with European Application No. 26 160 476.3, 8 pages.

* cited by examiner

*Primary Examiner* — Brian P Wolcott

(57) ABSTRACT

An apparatus includes a propeller, an engine configured to drive the propeller. The apparatus also includes a controller configured to control fuel flow to the engine responsive to the propeller operating in a first mode of operation and to control fuel flow to the engine in a second mode of operation responsive to the propeller operating in an uncontrollable high thrust condition.

20 Claims, 3 Drawing Sheets

USE OF PROPELLER ELECTRONIC CONTROLLER IN PROTECTION FROM UNCONTROLLABLE HIGH THRUST

TECHNICAL FIELD

This disclosure relates generally to a responding to an uncontrollable high thrust condition in a propeller engine. More specifically, this disclosure relates to controlling fuel flow to the propeller engine to reduce uncontrollable high thrust in the propeller engine.

BACKGROUND

Within propeller engines, existing control techniques for dealing with an uncontrollable high thrust (UHT) occurrence within the propeller engine normally involves first feathering the blades of the propeller to reduce propeller speed and then reducing fuel flow to the engine to further reduce engine speed. The problem with initially feathering the blades of the propeller is that high torque may be created due to the feathering process. Thus, techniques for reducing propeller speed during the occurrence of uncontrollable high thrust conditions in a manner that did not create high torque within the propeller engine would be desirable.

SUMMARY

This disclosure relates to a controlling fuel flow to protect a propeller engine from uncontrollable high thrust.

In some examples, an apparatus includes a propeller, an engine configured to drive the propeller. The apparatus also includes a controller configured to control fuel flow to the engine responsive to the propeller operating in a first mode of operation and to control fuel flow to the engine in a second mode of operation responsive to the propeller operating in an uncontrollable high thrust condition.

Any single one or any combination of the following features may be used with the examples above. The apparatus may include a primary fuel valve configured to provide fuel flow to the engine in the first mode of operation, a secondary fuel valve configured to provide fuel flow to the engine in the second mode of operation, and where the controller is further configured to control operation of the primary fuel valve in the first mode of operation and to control operation of the secondary fuel valve in the second mode of operation responsive to the propeller operating in the uncontrollable high thrust condition. The controller is further configured to have a first reference speed for decreasing the fuel flow using the primary fuel valve and a second reference speed for decreasing the fuel flow using the secondary fuel valve in the first mode of operation, where the first reference speed is lower than the second reference speed. The controller is further configured to have a first reference speed for decreasing the fuel flow using the primary fuel valve responsive to the uncontrollable high thrust condition and a second reference speed for decreasing the fuel flow using the secondary fuel valve in the second mode of operation, where the first reference speed is greater than the second reference speed. The controller is further configured to initiate the second mode of operation responsive to detection of the uncontrollable high thrust condition and discontinue the first mode of operation. The controller includes a control system module configured to control the fuel flow to the engine using the primary fuel valve responsive to a first reference speed in the first mode of operation. The controller includes a protection system module configured to control the fuel flow to the engine using the backup fuel valve responsive to a second reference speed in the second mode of operation. The protection system module is further configured to establish a new first reference speed for the control system module, where the new first reference speed is greater than the second reference speed.

In other examples, a method for controlling a propeller engine includes driving a propeller with an aircraft engine. The method also includes controlling fuel flow to the propeller engine responsive to the propeller operating in a first mode of operation using a controller and controlling fuel flow to the propeller engine in a second mode of operation responsive to the propeller operating in an uncontrollable high thrust condition using the controller.

Any single one or any combination of the following features may be used with the examples above. The method may include providing fuel flow to the propeller engine in the first mode of operation using a primary fuel valve, providing fuel flow to the propeller engine in the second mode of operation using a secondary fuel valve, controlling operation of the primary fuel valve in the first mode of operation using the controller, and controlling operation of the secondary fuel valve in the second mode of operation responsive to the propeller operating in the uncontrollable high thrust condition. The first reference speed is greater than the second reference speed. The method may include initiating the second mode of operation responsive to detection of the uncontrollable high thrust condition using the controller and discontinuing the first mode of operation using the controller. The method may include providing fuel flow to the propeller engine in the first mode of operation using a primary fuel valve and controlling the fuel flow to the propeller engine using the primary fuel valve responsive to a first reference speed in the first mode of operation using a control system module of the controller. The method may include providing fuel flow to the propeller engine in the second mode of operation using a backup fuel valve and controlling the fuel flow to the propeller engine using the backup fuel valve responsive to a second reference speed in the second mode of operation using a protection system module in the controller. The step of controlling the fuel flow to the propeller engine using the backup fuel valve further may include establishing a new first reference speed for the control system module using the protection system module of the controller, where the new first reference speed is greater than the second reference speed.

In still other examples, an apparatus includes a propeller, an engine configured to drive the propeller. The apparatus also includes a primary fuel valve configured to provide fuel flow to the engine in a first mode of operation, a secondary fuel valve configured to provide fuel flow to the engine in a second mode of operation, a controller configured to control fuel flow to control operation of the primary fuel valve in the first mode of operation and to control operation of the secondary fuel valve in the second mode of operation responsive to the propeller operating in an uncontrollable high thrust condition, where the controller further may include a control system module configured to control the fuel flow to the engine using the primary fuel valve responsive to a first reference speed in the first mode of operation and a protection system module configured to control the fuel flow to the engine using the backup fuel valve responsive to a second reference speed in the second mode of operation, where the protection system module is further configured to establish a new first reference speed for the control system module, where the new first reference speed is greater than the second reference speed.

Any single one or any combination of the following features may be used with the examples above. The apparatus where the controller is further configured to have a first reference speed for decreasing the fuel flow using the primary fuel valve and a second reference speed for decreasing the fuel flow using the secondary fuel valve in the first mode of operation, where the first reference speed is lower than the second reference speed. The controller is further configured to have a first reference speed for decreasing the fuel flow using the primary fuel valve responsive to the uncontrollable high thrust condition and a second reference speed for decreasing the fuel flow using the secondary fuel valve in the second mode of operation, where the first reference speed is greater than the second reference speed. The controller is further configured to initiate the second mode of operation responsive to detection of the uncontrollable high thrust condition and discontinue the first mode of operation.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 6, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Figure 1:
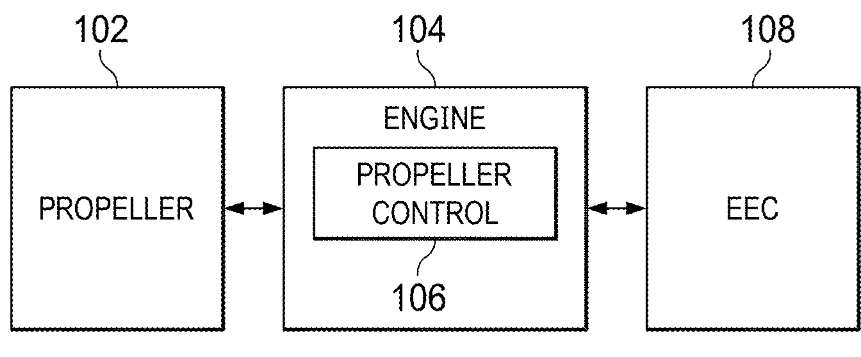
FIG. 1 illustrates a block diagram of the general control system of a propeller engine.

FIG. 1 illustrates a block diagram of the general operation environment of a control system for a propeller engine. The propeller 102 is driven by an engine 104 responsive to control signals from the propeller control module 106 within the engine 104. The propeller control module 106 controls pitch angle and fuel flow of the propeller 102 responsive to control signals from the electronic engine controller (EEC) 108.

Figure 2:
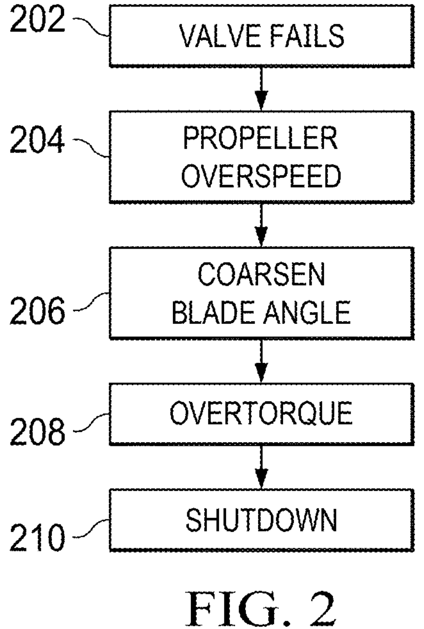
FIG. 2 illustrates a flow diagram of the prior art operation for controlling overspeed/high thrust conditions.

Referring now to FIG. 2, there is illustrated the manner in which control of an uncontrollable high thrust (UHT) or overspeed condition is managed by the propeller control module 106 and EEC 118. In a situation where a fuel supply valve to the engine fails at step 202, the propeller 102 will enter an uncontrollable high thrust (UHT) or overspeed condition at step 204. Responsive to the UHT/overspeed condition, the propeller control module 106 will coarsen the propeller 102 blade angle at step 206 in an attempt to slow down the engine 104. However, altering the propeller 102 blade angle will cause the propeller 102 to over torque at step 208. Over torque of the propeller causes the EEC 108 to trigger a shutdown solenoid or alternatively, the pilot may shut down the engine at step 210.

Figure 3:
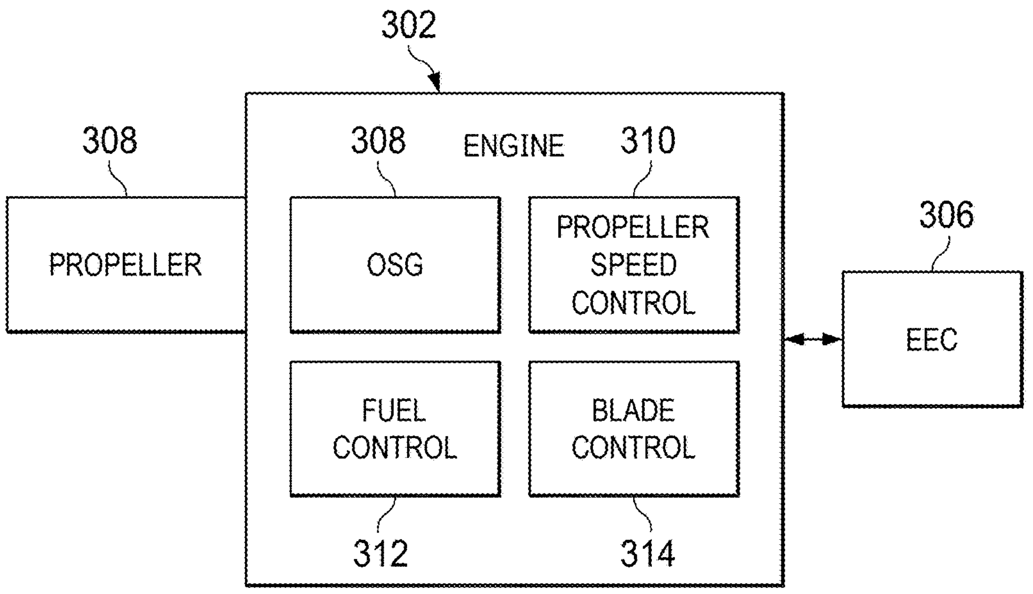
FIG. 3 illustrates an improved control system for overspeed/high thrust conditions within a propeller engine.

Referring now to FIG. 3, there is illustrated a block diagram of a first embodiment of the manner for altering the control logic of the engine 302 driving a propeller 304 responsive to control signals from the electronic engine control (EEC) module 306. The engine 302 includes an overspeed governor (OSG) 308 for monitoring for an engine overspeed conditions such as uncontrollable high thrust (UHT). A propeller speed controller 310 controls operation of the propeller 304 speed responsive to a fuel control module 312 and the blade control module 314. The fuel control module 312 controls the fuel flow to the engine in order to adjust the propeller 304 speed. The blade control module 314 controls the blade angles of the propeller 304 to control the propeller speed. As mentioned previously with respect to FIGS. 1 and 2, previous systems have initially utilized altering the blade angle to decrease propeller speed and then altering a fuel supply in order to deal with engine or propeller overspeed conditions. However, as noted above, this creates over torque problems. Thus, the control logic of the engine 302 of the present system first utilizes the fuel control module 312 in conjunction with the propeller speed controller 310 to control the propeller speed and then secondarily utilizes the blade control module 314 to control propeller speed. The above system may be implemented in a number of fashions within the engine 302. In a first embodiment, the system may mechanically implement the control of the engine 302 to mechanically control the fuel flow responsive to overspeed conditions. In a second embodiment, the system may electromechanically implement the control of the fuel flow to the engine to electrically actuate valves to increase the fuel flow.

Using the control logic defined by the propeller speed controller 310, the fuel control module 312 and the blade control module 314, the speed of the propeller 304 can be controlled responsive to detection of overspeed conditions by the OSG 308. The fuel control module 312 first reduces the fuel flow to maintain the propeller 304 at a nominal speed as a primary protection. The blade control module 314 increases the blade angle as a backup protection if necessary to reduce propeller 304 speed. This control logic configuration minimizes torque within the propeller 304 and allows for an induced reduction in fuel flow in the event of an EEC 306 induced runaway increase in fuel flow caused by, for example, a malfunctioning valve. Since the fuel flow reduction uses independent means from the EEC 306, it is effective in any EEC mode of operation. Thus, a sequence of failures would protect from UHT cases where the EEC would be fixed at supplying a high fuel flow during overspeed operation of the propeller.

The sequence of applying fuel flow control prior to blade angle control is applicable to all propeller systems such that the fuel flow reduction in the event of the propeller speed exceeding a specified threshold is more effective than the increase in the blade angle. The fuel flow reduction is configured to return the propeller 304 to a reference speed and would comprise only a partial reduction in fuel flow to the point at which the established propeller reference speed is achieved and maintained by control logic. The control logic first reduces the fuel flow by the fuel control module 312 and then the propeller blade angle is increased by the blade control module 314. This provides a significant reduction in engine 302 over torque in many failure conditions. Once the propeller 304 returns to operating at a reference speed, the engine operation continues in a normal mode of operation.

Although FIG. 3 illustrates one example of a fuel control system, various changes may be made to FIG. 3. For example, various components in FIG. 3 may be combined, further subdivided, replicated, omitted, or rearranged and additional components may be added according to particular needs. Also, the functions of the various components used in FIG. 1 may be implemented in any suitable manner.

Figure 4:
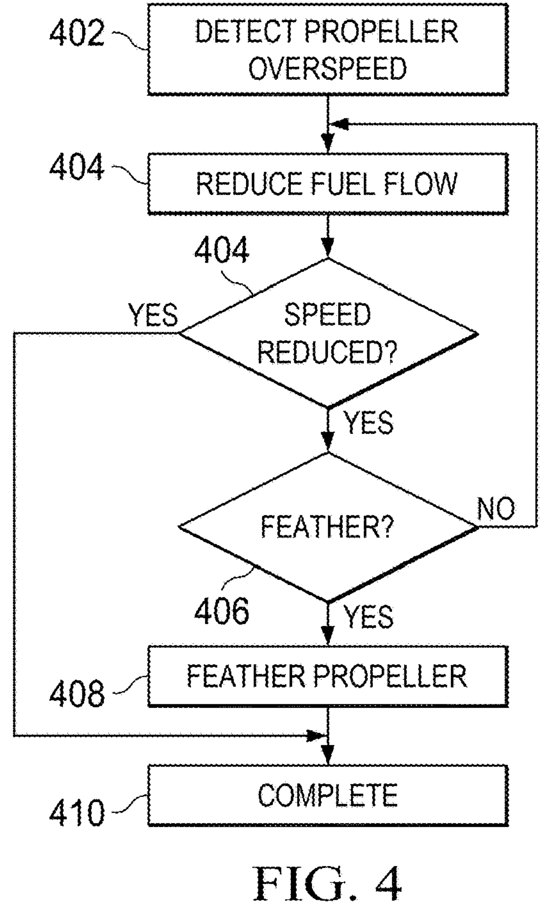
FIG. 4 illustrates a flow diagram of a first embodiment of the process for controlling overspeed/high thrust conditions within a propeller engine.

Referring now to FIG. 4, there is illustrated a flow diagram of the process for controlling a propeller 304 overspeed condition according to the control logic of FIG. 3. When the propeller overspeed governor, which uses means of fuel flow reduction to decelerate propeller, 308 is activated to open at a propeller overspeed condition at step 402, the fuel control module 312 will reduce the fuel flow to the engine 302 in an attempt to decrease the propeller speed. Therefore, at the event of uncontrollable high thrust, governing the propeller 304 to new, and higher reference speed than the threshold for the propeller overspeed governor activation allows for fuel reduction. Inquiry step 404 determines if the speed of the propeller 304 has been sufficiently reduced and if so, control passes to step 410 and the process is complete with no further reductions in fuel flow or feathering of the propeller blades being necessary. If inquiry step 404 determines that the speed has not been sufficiently reduced, inquiry step 406 determines if the blade control module 314 should begin feathering the blades of the propeller 304. If not, control passes back to step 404 and further reduction of the fuel flow is carried out. If inquiry step 406 determines that feathering of the propeller blades is now necessary, the propeller blades are feathered at step 408. The combination of the fuel reduction and the blade feathering of the propeller 304 should then bring the propeller out of the overspeed condition and the process is complete at step 410.

Although FIG. 4 illustrates one example of a process for controlling engine speed using fuel flow, various changes may be made to FIG. 4. For example, while shown as a series of steps, various steps in FIG. 4 may overlap, occur in parallel, occur in a different order, or occur any number of times.

Figure 5:
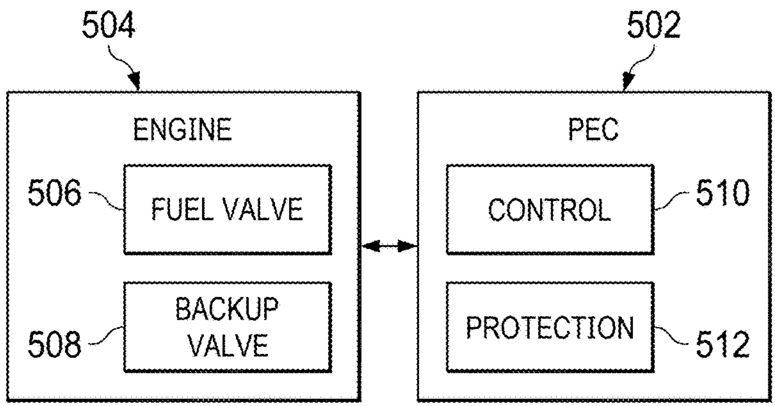
FIG. 5 illustrates a block diagram of a further embodiment of a control system for reducing overspeed/high thrust conditions using fuel flow.

Referring now to FIG. 5, there is illustrated a block diagram of a further embodiment for controlling fuel flow in order to deal with conditions such as UHT. When the fuel flow is being utilized to control, for example, a UHT condition as described hereinabove, the operation of the logic within the propeller electronic controller 502 may control the engine 504 in order to overcome failures of primary fuel valves 506 contained within the engine. In this embodiment, in addition to the primary fuel valve 506 that controls fuel flow to the engine 504, a backup fuel valve 508 is included to control fuel flow to the engine 504 in the event of the failure of primary fuel valve 506. Within the propeller electronic controller 502 control modules are implemented for controlling each of the primary fuel valve 506 and backup fuel valve 508. Control system module 510 controls operation of the primary fuel valve 506 during normal engine operation. However, should the primary fuel valve 506 fail causing the engine 504 to enter a UHT condition, protection system module 512 will take over control of fuel supply to the engine 504 within the propeller electronic controller 502. The protection system module 512 will control operation of the backup fuel valve 508 in order to reduce propeller speed and remove the engine from the UHT condition.

The protection system module 512 further establishes a new reference speed threshold level to indicate overspeed conditions within the control system module 510. The new predetermined reference speed provided by the protection system module 512 enables control of the protection system module 512 with respect to control system module 510 for the fuel flow. The predetermined reference speed established for the control system module 510 will be greater than the one at which the protection system module 512 reacts. This will enable the protection system module 512 to start reducing fuel flow to maintain the new reference speed since the protection system module 512 reference speed is below the reference speed of the control system module 510. The control system module 510 is inoperable with respect to the primary fuel valve 506 at UHT for fuel control since its new operating reference speed is above the operating reference speed of the protection system module 512. This enables the use of a fuel flow reduction using the protection system module 512 that is independent from the control system module 510 that normally controls the fuel supply.

For example, the threshold reference speed at which the protection system module 512 begins to operate is 103% of the nominal speed. At the occurrence of a UHT condition, the propeller control system module 510 will receive a new reference speed of 104% nominal speed. The protection system module 512 will start reducing the fuel flow to maintain the propeller speed of 103% of nominal. The control system module 510 will not interrupt the fuel control because at UHT it is not working, nor will it interrupt propeller control since control considers a new reference speed of 104% of nominal speed. This will assist in maintaining the protection system module 512 in an active state.

Once the propeller electronic controller 502 detects a UHT condition, the propeller electronic controller will be governing the propeller speed according to the new reference speed to allow the propeller to reach a speed in order to activate the fuel flow reduction by the protection system module 512 this is achieved by changing the reference of the nominal speed originally provided by the control system module 510 for example 100% speed to a speed that is above the activation speed of the propeller overspeed governor (OSG) such as 105%, if the OSG opens fuel flow at 103% for the governing speed. The protection system module 512 governs the speed according to a new reference speed value to allow the propeller to reach the speed of activation of fuel flow reduction controlled by the protection system module 512. This is achieved by changing the reference speed value used by the propeller speed controller from the nominal value originally used, for example 100% speed, to a speed that is above the activation of the protective fuel flow reduction such as hundred and 5% if the protection threshold is 103% for governing propeller speed.

Although FIG. 5 illustrates one example of a fuel control system, various changes may be made to FIG. 5. For example, various components in FIG. 5 may be combined, further subdivided, replicated, omitted, or rearranged and additional components may be added according to particular needs. Also, the functions of the various components used in FIG. 1 may be implemented in any suitable manner.

Figure 6:
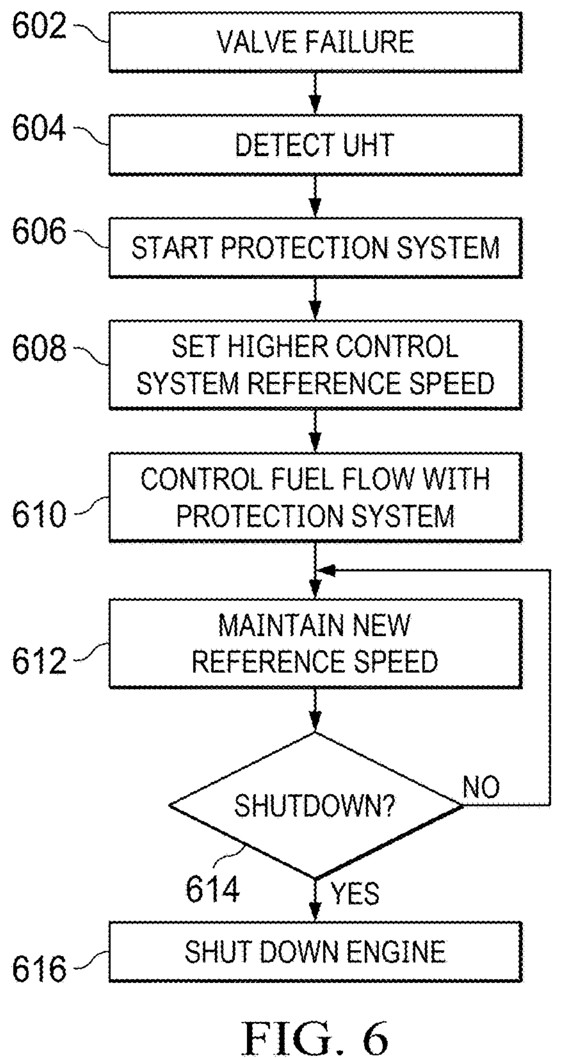
FIG. 6 illustrates a flow diagram of a second embodiment of a process for controlling overspeed/high thrust conditions within a propeller engine.

Referring now to FIG. 6, there is illustrated a flow diagram of the process for controlling the fuel flow within an engine 504 that has entered a UHT condition. Once a fuel valve fails at step 602 and remains in an open condition, this will cause unlimited fuel to flow to the engine 504 and cause a UHT condition with respect to the propeller. The UHT condition is detected by the propeller electronic controller 502 at step 604. Responsive to detection of the UHT condition, the control of the protection system module 512 is initiated at step 606. The protection system module 512 will control the operation of the backup fuel valve 508 in order to enable fuel supply to the engine 504 to be controlled in view of the failed primary fuel valve 506. Initiation of the protection system module 512 at step 606 will cause a higher control system module 510 reference speed to be established at step 608 and provided to the control system module 510. This higher control system reference speed will enable the operation of the engine 504 at a higher propeller speed in order to enable control of the backup fuel valve 508 by the protection system module 512. The new control system reference speed will be greater than the one that is used by the protection system module 512 in order to enable control by the protection system module 512. Thus, if the protection system module 512 is configured to decrease fuel flow via the backup fuel valve 508 when the engine is operating at 103%, the reference speed provided to the control system module 510 would be greater than or equal to 103% to enable control of the propeller speed by the protection system module 512. The fuel flow is reduced at step 610 using the protection system module 512 control of the backup fuel valve 508. The system continues to operate at the newly provided reference speed at step 612 in order to enable continue operation of the protection system module 512 in view of the failed primary fuel valve 506.

The control system module 510 within the propeller electronic controller 502 will try to maintain the new reference speed. However, this may result in a cycle of increasing the propeller speed by the control system module 510 and decreasing of the propeller speed by the protection system module 512. The protection system module 512 reduces fuel in order to maintain the newly provided reference speed. The protection system module 512 uses the backup fuel valve 508 that is independent from the primary fuel valve 506 that is used by the control system module 510. The engine 504 under control of the protection system module 512 may be shut down by the pilot in order to further protect the engine 504. Inquiry step 614 determines if a shutdown condition from either the pilot or an automatic controller has been provided. If not, control will pass back to step 612 to maintain operation at the new reference speed. Once a shutdown instruction is detected, the engine 504 is shut down at step 616.

Although FIG. 6 illustrates one example of a process for controlling engine speed using fuel flow, various changes may be made to FIG. 6. For example, while shown as a series of steps, various steps in FIG. 6 may overlap, occur in parallel, occur in a different order, or occur any number of times.

A benefit of this solution is that the momentary governing of the speed above the protection thresholds will provide time for a pilot to pull the throttle to idle during the over thrust condition. Additionally, the operation at reference speeds above the activation of the protective system fuel reduction will assist in maintaining engine power below unsafe power levels.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:

a propeller;

an engine configured to drive the propeller;

a controller configured to control fuel flow to the engine responsive to the propeller operating in a first mode of operation and to control fuel flow to the engine in a second mode of operation responsive to the propeller operating in an uncontrollable high thrust condition; and wherein the controller is further configured to have a first reference speed for decreasing the fuel flow to the engine and a second reference speed for decreasing the fuel flow to the engine in the first mode of operation, wherein the first reference speed is lower than the second reference speed.

2. The apparatus of claim 1 further comprising:

a primary fuel valve configured to provide fuel flow to the engine in the first mode of operation;

a secondary fuel valve configured to provide fuel flow to the engine in the second mode of operation; and wherein the controller is further configured to control operation of the primary fuel valve in the first mode of operation and to control operation of the secondary fuel valve in the second mode of operation responsive to the propeller operating in the uncontrollable high thrust condition.

3. The apparatus of claim 2, wherein the controller is further configured to decrease the fuel flow using the primary fuel valve and to decrease the fuel flow using the secondary fuel valve in the first mode of operation.

4. The apparatus of claim 2, wherein the controller is further configured to have a first reference speed for decreasing the fuel flow using the primary fuel valve responsive to the uncontrollable high thrust condition and a second reference speed for decreasing the fuel flow using the secondary fuel valve in the second mode of operation, wherein the first reference speed is greater than the second reference speed.

5. The apparatus of claim 1, wherein the controller is further configured to initiate the second mode of operation responsive to detection of the uncontrollable high thrust condition and discontinue the first mode of operation.

6. The apparatus of claim 1 further comprising:

a primary fuel valve configured to provide fuel flow to the engine in the first mode of operation; and wherein the controller includes a control system module configured to control the fuel flow to the engine using the primary fuel valve responsive to a first reference speed in the first mode of operation.

7. The apparatus of claim 6 further comprising:

a backup fuel valve configured to provide fuel flow to the engine in the second mode of operation; and wherein the controller includes a protection system module configured to control the fuel flow to the engine using the backup fuel valve responsive to a second reference speed in the second mode of operation.

8. The apparatus of claim 7, wherein the protection system module is further configured to establish a new first reference speed for the control system module, wherein the new first reference speed is greater than the second reference speed.

9. A method for controlling a propeller engine, comprising:

driving a propeller with an aircraft engine;

controlling fuel flow to the propeller engine responsive to the propeller operating in a first mode of operation using a controller;

controlling fuel flow to the propeller engine in a second mode of operation responsive to the propeller operating in an uncontrollable high thrust condition using the controller; and establishing a first reference speed for decreasing the fuel flow to the engine and a second reference speed for decreasing the fuel flow to the engine in the first mode of operation, wherein the first reference speed is lower than the second reference speed.

10. The method of claim 9 further comprising:

providing fuel flow to the propeller engine in the first mode of operation using a primary fuel valve;

providing fuel flow to the propeller engine in the second mode of operation using a secondary fuel valve;

controlling operation of the primary fuel valve in the first mode of operation using the controller; and controlling operation of the secondary fuel valve in the second mode of operation responsive to the propeller operating in the uncontrollable high thrust condition.

11. The method of claim 10 further comprising decreasing the fuel flow using the primary fuel valve responsive to the first reference speed and decreasing the fuel flow using the secondary fuel valve responsive to the second reference speed in the first mode of operation, wherein the first reference speed is lower than the second reference speed.

12. The method of claim 10 further comprising establishing a first reference speed for decreasing the fuel flow using the primary fuel valve and a second reference speed for decreasing the fuel flow using the secondary fuel valve in the second mode of operation, wherein the first reference speed is greater than the second reference speed.

13. The method of claim 10 further comprising:

initiating the second mode of operation responsive to detection of the uncontrollable high thrust condition using the controller; and discontinuing the first mode of operation using the controller.

14. The method of claim 9 further comprising:

providing fuel flow to the propeller engine in the first mode of operation using a primary fuel valve; and controlling the fuel flow to the propeller engine using the primary fuel valve responsive to a first reference speed in the first mode of operation using a control system module of the controller.

15. The method of claim 14 further comprising:

providing fuel flow to the propeller engine in the second mode of operation using a backup fuel valve; and controlling the fuel flow to the propeller engine using the backup fuel valve responsive to a second reference speed in the second mode of operation using a protection system module in the controller.

16. The method of claim 15, wherein the step of controlling the fuel flow to the propeller engine using the backup fuel valve further comprises establishing a new first reference speed for the control system module using the protection system module of the controller, wherein the new first reference speed is greater than the second reference speed.

17. An apparatus, comprising:

a propeller;

an engine configured to drive the propeller;

a primary fuel valve configured to provide fuel flow to the engine in a first mode of operation;

a secondary fuel valve configured to provide fuel flow to the engine in a second mode of operation;

a controller configured to control fuel flow to control operation of the primary fuel valve in the first mode of operation and to control operation of the secondary fuel valve in the second mode of operation responsive to the propeller operating in an uncontrollable high thrust condition, wherein the controller further comprises:

a control system module configured to control the fuel flow to the engine using the primary fuel valve responsive to a first reference speed in the first mode of operation; and a protection system module configured to control the fuel flow to the engine using the backup fuel valve responsive to a second reference speed in the second mode of operation, wherein the protection system module is further configured to establish a new first reference speed for the control system module, wherein the new first reference speed is greater than the second reference speed.

18. The apparatus of claim 17, wherein the controller is further configured to have a first reference speed for decreasing the fuel flow using the primary fuel valve and a second reference speed for decreasing the fuel flow using the secondary fuel valve in the first mode of operation, wherein the first reference speed is lower than the second reference speed.

19. The apparatus of claim 17, wherein the controller is further configured to have a first reference speed for decreasing the fuel flow using the primary fuel valve responsive to the uncontrollable high thrust condition and a second reference speed for decreasing the fuel flow using the secondary fuel valve in the second mode of operation, wherein the first reference speed is greater than the second reference speed.

20. The apparatus of claim 17, wherein the controller is further configured to initiate the second mode of operation responsive to detection of the uncontrollable high thrust condition and discontinue the first mode of operation.

* * * * *